May 27, 1924.

H. V. DUTY

WIRE LINE CLAMP

Filed April 11, 1923    2 Sheets-Sheet 1

1,495,258

Inventor.
Harry V. Duty.
by
his Attorney.

May 27, 1924.
H. V. DUTY
1,495,258
WIRE LINE CLAMP
Filed April 11, 1923    2 Sheets-Sheet 2
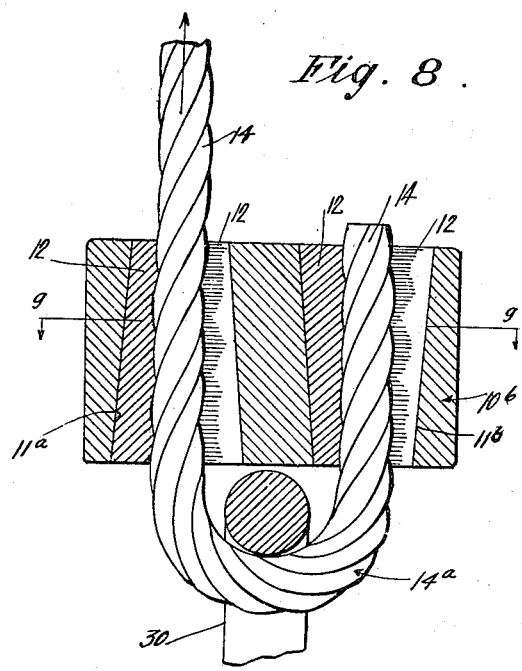
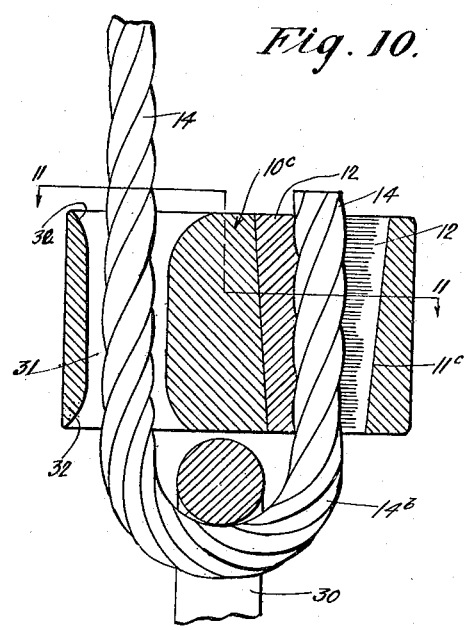
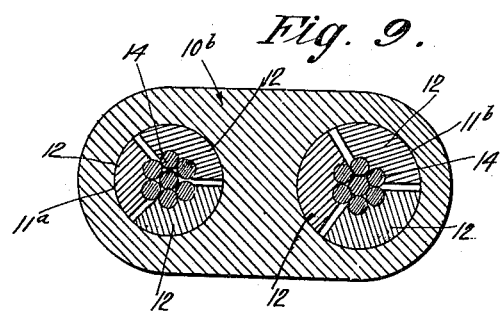
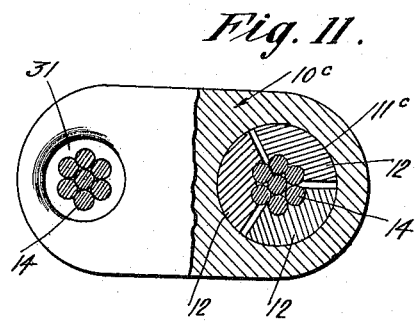
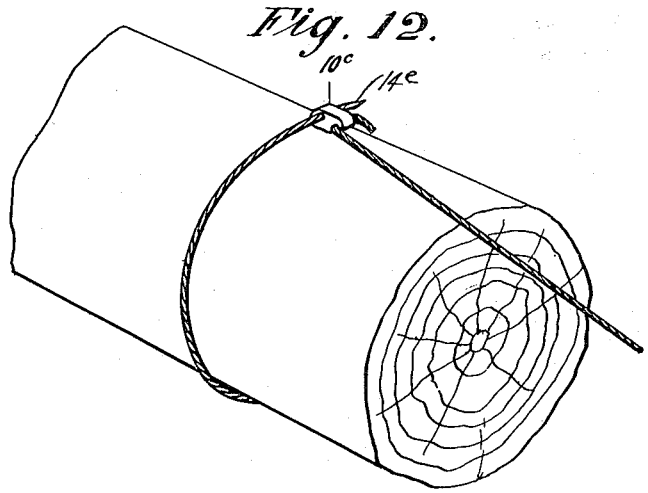
Inventor.
Harry V. Duty.
by
his Attorney.

Patented May 27, 1924.

1,495,258

UNITED STATES PATENT OFFICE.

HARRY V. DUTY, OF LONG BEACH, CALIFORNIA.

WIRE-LINE CLAMP.

Application filed April 11, 1923. Serial No. 631,281.

*To all whom it may concern:*

Be it known that I, HARRY V. DUTY, a citizen of the United States, residing at Long Beach, in the county of Los Angeles and State of California, have invented new and useful Improvements in Wire-Line Clamps, of which the following is a detailed specification.

This invention has reference to a device for clamping or securing, in various manners, a flexible line or cable; and although it is particularly adapted to a wire line, the invention is not necessarily limited to use on steel cables, as will be apparent from the following description. However, as the most prevalent use of such a device is in connection with a wire line, the following description will deal with the device as so used.

It may be stated as a general object of the invention to provide a clamp and other associated members which may be very easily and quickly applied to a line; which will clamp and hold the line very securely; and which is capable of application to a variety of uses. All of these things, and various other objects and corresponding features of accomplishment of the invention, and an indication of various uses to which the invention may be put, will all be best understood from the following specification wherein I describe certain specific forms of device illustrative of the invention; reference for this purpose being had to the accompanying drawings in which—

Figure 1:
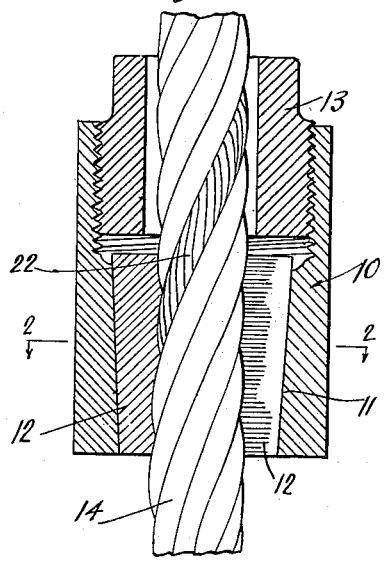
Figure 5:
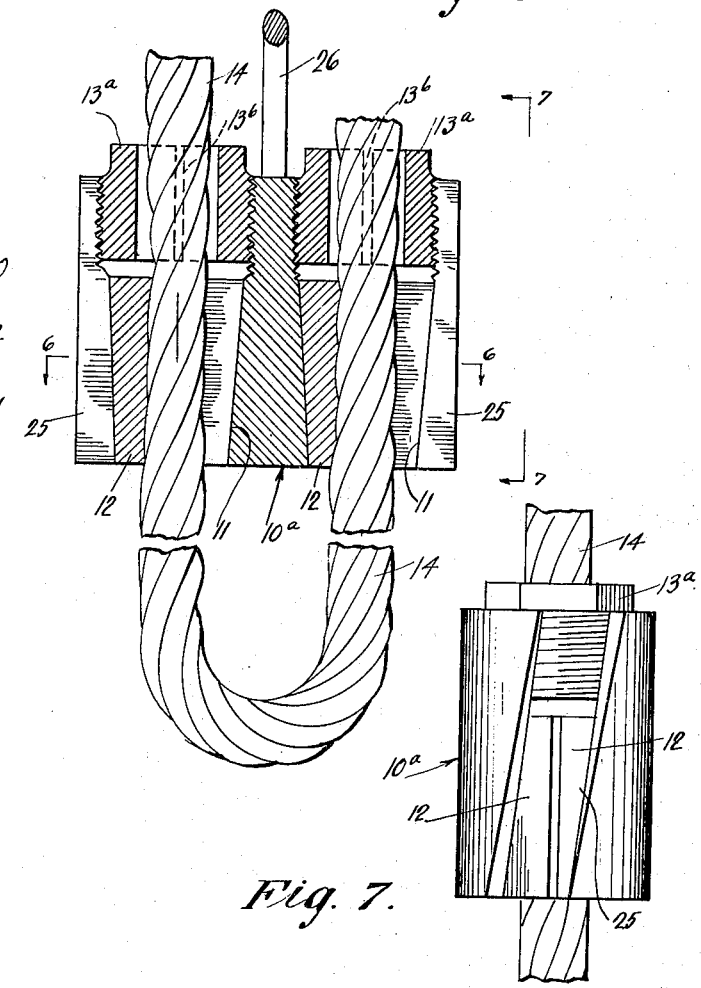
Figure 2:
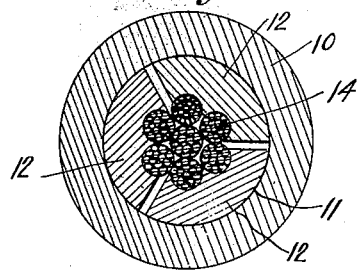
Figure 7:
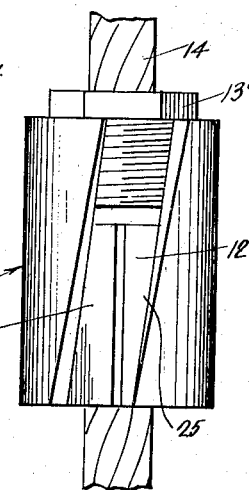
Figure 3:
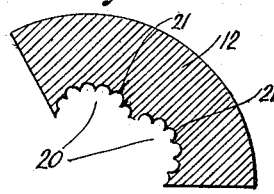
Figure 6:
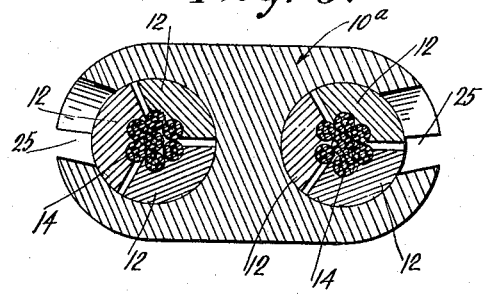
Figure 4:
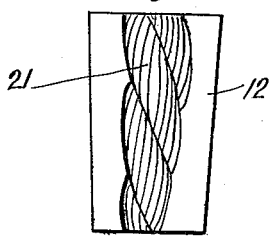

Fig. 1 is a longitudinal central section of a simple form of clamp applied to a line; Fig. 2 is a cross section on line 2—2 of Fig. 1; Fig. 3 is an enlarged detail cross section of one of the clamping slips; Fig. 4 is an inner face view of one of the clamping slips; Fig. 5 is a central longitudinal section showing a double form of clamp adapted for particular uses; Fig. 6 is a cross section on line 6—6 of Fig. 5; Fig. 7 is a side elevation taken as indicated by line 7—7 on Fig. 5; Fig. 8 is a longitudinal vertical section showing another form of double clamp; Fig. 9 is a cross section on line 9—9 of Fig. 8; Fig. 10 is a longitudinal central section of another form of device embodying a single clamp and a guide eye for the line; Fig. 11 is a section on line 11—11 of Fig. 10; and Fig. 12 is a perspective illustrating one of the uses to which such a form of device as shown in Figs. 10 and 11 may be put.

Referring first to the simple form shown in Figs. 1 and 2, I show a cylindrical body 10 having in one end a conical bore 11 that contains the wedge slips 12, which are here shown as three in number but which may of course be of any number desired. At the other end of body 10 a screw-threaded plug 13 is inserted merely to keep the slips from dropping out of the large end of the bore. The line is shown at 14.

The inner surface of each slip 11 is made to conform to the exterior surface of the line. Thus, each slip 12 has spiral flutings 20 that correspond to the general spiral twist of the line; and then, in the bottom surface of each spiral flute 20 there are small flutings 21 that correspond with the exterior surface presented by the individual wires 22 that go to make up the spiral strands of the line. These formations on the inner surfaces of the wedge slips may be formed in any suitable manner. For instance, they may be formed by casting the wedge slips directly against the line or against a die that presents a facsimile of the exterior surface of the line.

The peculiar efficacy of the small flutings 21 is to prevent the line twisting spirally out of the wedge slips. It will readily be seen that these flutings, extending as they do across the main spiral flutings 20, and engaging the individual wires of the line, prevent the strands of the line from moving in the spiral flutings 20, and thus they prevent the line from slipping out of the wedge slip by twisting spirally out of those slips as they would otherwise be liable to do. This inner surface formation of wedge slips is used in the various forms of devices that I describe herein.

The form of device shown in Fig. 1 is a simple and convenient one for attaching a lug or other member to a line. For instance, this form may be conveniently used at the end or in any other portion of a line, where it is desired to attach the line to any member. It is very convenient, for instance, where it is desired to attach the end of a line to a hoisting drum. Ordinarily the end of the line is passed through a hole or notch in the drum flange and is then twisted into a loop or fastened in some other manner. By using my device, it is only necessary to pass the end of the line through the notch or hole, and then slip the device endwise onto the line, when it forms a lug firmly set on the line and against which the line may pull.

And this form may easily be used as a rope socket for any use, as will be readily understood.

The form shown in Fig. 5 is essentially a duplication of the form shown in Fig. 1. Here the body 10ª contains two conical bores 11 with sets of slips 12, both sets working in the same direction. The plugs shown at 13ª are preferably split, as indicated at 13ᵇ, so that these plugs may be placed on the line without the necessity of threading them over the line from its end. Each side of body 10ª has a spiral slot 25 wide enough to pass over the line, so that the body also does not have to be threaded onto the end.

This form of device is particularly useful where it is desired to pick up a line that hangs in a long loop from the top of a derrick for instance. It will be apparent from the description how the device may be used for this purpose, the two parts of the body being passed laterally over the line, the slips put in place, and the split plugs then put in place; and then the line may be hoisted by applying a hoisting tackle to the hoisting eye shown at 26.

In Figs. 8 and 9 I show another form embodying a double set of wedge slips. In this case the body 10ᵇ has two tapering bores 11ª and 11ᵇ tapering in opposite directions, and the wedge slips 12 taper and wedge in opposite directions. Here the line 14 may be passed through one of the sets of wedge slips, then, after forming a loop 14ª, may be passed through the other set of wedge slips. Loop 14ª may be formed of any length desired; and this loop may be passed, for instance, through the shackle 30 of hoisting tackle or the like. When a pull is exerted on the line in the direction indicated by the arrow, it will be seen that the clamp device cannot move down on that part of the line, and the other end of the line cannot move down in the clamp device. Therefore, the loop formed in the line is maintained in its original length—it cannot be closed up by the pull on the line.

In Figs. 10 and 11 I show a form of device somewhat similar to that shown in Figs. 8 and 9 except that here the body 10ᶜ has a single tapering bore 11ᶜ containing the wedge slips 12; and also has a bore at 31 that forms in effect a loose guide eye for the line. Here the loop 14ᵇ formed in the line will pull up closely on shackle 30 or any other device through which the line loop is passed. This form may be preferable in certain circumstances, while the form of Fig. 8 may be preferable in others.

For instance, the form of Fig. 12 is particularly adaptable to logging. It has been the usual practice in logging, after a tree is felled, to excavate an opening in the earth under the log large enough to pass a hook or other shackle that is attached to the end of the logging line. It is quite often a laborious task to excavate an opening sufficiently large enough, especially where the soil is rocky or rooty. In using my device I merely point the end of the logging line 14ᵇ as illustrated at 14ᶜ. This may easily be done by welding the strands of the line together at its end, and then pointing the welded end. It is an easy matter to make an opening under a log, if one is not already present, large enough to poke the pointed line through. Before this is done the line has been threaded through the loose running eye 31 of body 10ᶜ. Then the line is passed around the log and the line end inserted through the tapered bore 11ᶜ, and the slips put in place. When this is done, the slips wedging in the proper direction, the logging line is formed in a hitch around the log, ready to pull the log away. To keep the body 10ᶜ from cutting the line, the ends of the bore 31 are preferably rounded away as indicated at 32.

It will be readily understood of course, that any of the other forms herein described may be supplied with a body having a slotted side wall such as described in connection with Fig. 5; and also that the split plugs may be applied to any of the forms herein described. This may be done wherever it may be desirable to attach any of the other forms to a line without the necessity of threading the line through it or threading the device over the end of the line.

I have not endeavored to illustrate or describe all the variety either of forms that my device may take or of the uses to which it may be put. It suffices to say that the forms and uses herein described are merely indicative and typical of various others; and I wish it to be understood that my invention is not limited to the specific things herein set out except as specifically so delineated in the following claims.

Having described a preferred form of my invention, I claim:

1. A line clamp comprising a body with a tapering bore, and line engaging wedge slips in the bore; the wedge slips having inner line engaging faces conforming to the spiral twist of the line strands and also to the surface conformation of the individual members of the line strands.

2. A line clamp comprising a body with two bores, at least one of which is tapering, and line engaging wedge slips in the tapering bore; the wedge slips having inner line engaging faces conforming to the spiral twist of the line strands and also to the surface conformation of the individual members of the line strands.

3. A line clamp comprising a body with two bores, at least one of which is tapering, and line engaging wedge slips in the tapering bore, the other bore being of a size to pass the line; the wedge slips having inner line engaging faces conforming to the spiral twist of the line strands and also to the surface conformation of the individual members of the line strands.

4. A line clamp comprising a body with a tapering bore, and line engaging wedge slips in the bore; the wedge slips having inner line engaging faces conforming to the spiral twist of the line strands and also to the surface conformation of the individual members of the line strands; and means in the body at the larger end of the bore to prevent the wedge slips from passing out of the bore.

5. A line clamp comprising a body with a tapering bore, and line engaging wedge slips in the bore; the wedge slips having inner line engaging faces conforming to the spiral twist of the line strands and also to the surface conformation of the individual members of the line strands; and means in the body at the larger end of the bore to prevent the wedge slips from passing out of the bore; said body having in its side a line-passing slot communicating with the tapering bore, and the last mentioned means comprising a split plug.

6. A line clamp comprising a body with two tapering bores, and line engaging wedge slips in each of the bores; the wedge slips having inner line engaging faces conforming to the spiral twist of the line strands and also to the surface conformation of the individual members of the line strands.

7. A line clamp comprising a body with two tapering bores, and line engaging wedge slips in each of the bores, the body having two line-passing slots through its wall communicating with the two tapering bores.

8. A line clamp comprising a body with a tapering bore, and line engaging wedge slips in the bore; the wedge slips having inner line engaging faces conforming to the spiral twist of the line strands and also to the surface conformation of the individual members of the line strands; and means in the body at the larger end of the bore to prevent the wedge slips from passing out of the bore; said body having in its side a diagonal line-passing slot communicating with the tapering bore, and the last mentioned means comprising a split plug.

9. A line clamp comprising a body with two tapering bores, and line engaging wedge slips in each of the bores, the body having two diagonal line-passing slots through its wall communicating with the two tapering bores.

10. A line clamp comprising a body with two tapering bores, and line engaging wedge slips in each of the bores, the body having two diagonal line-passing slots through its wall communicating with the two tapering bores; and split plugs closing the larger ends of the tapering bores to prevent the slips passing out of the bores.

11. A line clamp comprising a body with two bores, at least one of which is tapering, and line engaging wedge slips in the tapering bore, the other bore being of a size to freely pass the line; the wedge slips having inner line engaging faces conforming to the spiral twist of the line strands and also to the surface conformation of the individual members of the line strands.

In witness that I claim the foregoing I have hereunto subscribed my name this 26th day of March 1923,

HARRY V. DUTY.